(12) United States Patent
Moynihan et al.

(10) Patent No.: US 8,109,606 B2
(45) Date of Patent: Feb. 7, 2012

(54) PRINTING IMAGES AND FLAVORS ON SUBSTRATES

(75) Inventors: Edward R. Moynihan, Plainfield, NH (US); Richard J. Baker, West Lebanon, NH (US); Edward T. Chrusciel, Nashua, NH (US)

(73) Assignee: FUJIFILM Dimatix, Inc., Lebanon, NH (US)

( * ) Notice: Subject to any disclaimer, the term of this patent is extended or adjusted under 35 U.S.C. 154(b) by 187 days.

(21) Appl. No.: 11/689,648

(22) Filed: Mar. 22, 2007

(65) Prior Publication Data

US 2007/0222830 A1    Sep. 27, 2007

Related U.S. Application Data

(60) Provisional application No. 60/743,652, filed on Mar. 22, 2006.

(51) Int. Cl.
    *B41J 2/21* (2006.01)
(52) U.S. Cl. .................. 347/43; 347/100; 106/31.13
(58) Field of Classification Search ............... 347/7, 15, 347/14, 40–43, 84–86, 95–100
    See application file for complete search history.

(56) References Cited

U.S. PATENT DOCUMENTS

| | | | |
|---|---|---|---|
| 4,967,207 A | 10/1990 | Ruder | |
| 5,437,879 A | 8/1995 | Kabse et al. | |
| 5,598,196 A | 1/1997 | Braun | |
| 5,599,555 A | 2/1997 | El-Nokaly | |
| 5,800,601 A | 9/1998 | Zou et al. | |
| 5,975,675 A * | 11/1999 | Kim | 347/20 |
| 6,077,207 A | 6/2000 | Yokoyama et al. | |
| 7,121,203 B2 * | 10/2006 | Pickering et al. | 101/424.1 |
| 7,431,956 B2 * | 10/2008 | Baydo et al. | 426/250 |
| 2002/0174800 A1 | 11/2002 | Moreland | |
| 2003/0224090 A1 | 12/2003 | Pearce et al. | |
| 2005/0100640 A1 * | 5/2005 | Pearce | 426/89 |
| 2006/0038866 A1 * | 2/2006 | Wen et al. | 347/100 |
| 2006/0081619 A1 | 4/2006 | Cantu | |
| 2006/0275532 A1 * | 12/2006 | Dechert | 426/383 |
| 2008/0032011 A1 * | 2/2008 | Liniger et al. | 426/250 |

FOREIGN PATENT DOCUMENTS

| | | |
|---|---|---|
| JP | 2004-216838 | 8/2004 |
| JP | 2005-254631 | 9/2005 |
| JP | 2005-275549 | 10/2005 |
| WO | 2006/023615 | 3/2006 |

OTHER PUBLICATIONS http://www.pcworld.com/article/id.119822-page.1/article.html, Mar. 1, 2005.
International Search Report, Patent Cooperation Treaty, Feb. 28, 2008.
U.S. Appl. No. 60/743,652, Moynihan et al., Filed Mar. 22, 2006; Copies of Application and Pair Transaction History.

(Continued)

*Primary Examiner* — Thinh Nguyen
(74) *Attorney, Agent, or Firm* — Fish & Richardson P.C.

(57) ABSTRACT

In general, a fluid delivery system includes a plurality of fluid delivery printheads, a first reservoir for holding an ink, the first reservoir coupled to a first one of the plurality of fluid delivery printheads, and a second reservoir for holding a flavored liquid, the second reservoir coupled to a second one of the plurality of fluid delivery printheads.

24 Claims, 3 Drawing Sheets

OTHER PUBLICATIONS

International Preliminary Report on Patentability dated Oct. 2, 2008 from corresponding International Application No. PCT/US2007/064604.

Office action dated Jan. 8, 2010 in co-pending Chinese application No. 200780010003.1.

Search Report dated Nov. 3, 2010 issued in European application No. 07759087.5, 6 pgs.

Office action received in co-pending European application No. 07759087.5 dated Jul. 11, 2011 (235Ep1).

* cited by examiner

PRINTING IMAGES AND FLAVORS ON SUBSTRATES

This application claims the benefit of priority of U.S. provisional patent application 60/743,652, filed Mar. 22, 2006, which is incorporated in its entirety here by reference.

BACKGROUND

Droplet ejection devices are used for depositing droplets on a substrate. Ink jet printers are a type of droplet ejection device. Ink jet printers typically include an ink supply to a nozzle path. The nozzle path terminates in a nozzle opening from which ink drops are ejected. Ink drop ejection is controlled by pressurizing ink in the ink path with an actuator, which may be, for example, a piezoelectric deflector, a thermal bubble jet generator, or an electro statically deflected element. A typical printhead has an array of ink paths with corresponding nozzle openings and associated actuators, such that drop ejection from each nozzle opening can be independently controlled. In a drop-on-demand printhead, each actuator is fired to selectively eject a drop at a specific pixel location of an image as the printhead and a printing substrate are moved relative to one another. In high performance printheads, the nozzle openings typically have a diameter of 50 microns or less, e.g. around 35 microns, are separated at a pitch of 100-300 nozzle/inch, have a resolution of 100 to 3000 dpi or more, and provide drop sizes of about 1 to 70 picoliters or less. Drop ejection frequency can be 10 kHz or more.

Printing accuracy is influenced by a number of factors, including the size and velocity uniformity of drops ejected by the nozzles in the head and among multiple heads in a printer. The drop size and drop velocity uniformity are in turn influenced by factors such as the dimensional uniformity of the ink paths, acoustic interference effects, contamination in the ink flow paths, and the actuation uniformity of the actuators.

SUMMARY

Generally, the invention relates to printing systems and methods of printing on substrates. In an aspect, a fluid delivery system includes a plurality of fluid delivery printheads, a first reservoir for holding an ink, the first reservoir coupled to a first one of the plurality of fluid delivery printheads, and the second reservoir for holding a flavored liquid, a second reservoir coupled to a second one of the plurality of fluid delivery printheads.

Other implementations may include one or more of the following features. A fluid delivery system that includes a controller configured to control the first one of the plurality of fluid delivery printheads to deposit the ink onto a substrate and to control the second one of the plurality of fluid delivery printheads to deposit the flavored liquid onto the substrate. In the fluid delivery system, the first one of the plurality of fluid delivery printheads is configured to deposit the ink onto an area of the substrate and to control the second one of the plurality of fluid delivery printheads to deposit the flavored liquid onto the same area of the substrate.

In another aspect, a fluid delivery system has a fluid delivery printhead, a first reservoir for holding ink, wherein the first reservoir is coupled to the printhead, a second reservoir for holding a flavored liquid, wherein the second reservoir is coupled to the printhead, and a controller configured to control the fluid delivery printhead to deposit the ink and flavored liquid onto a substrate.

By printing both images and flavors onto a food product, a person's sense of sight and taste are stimulated. The eating experience can be more enjoyable when the flavors and images correlate to each other. To enhance a person's sensory perception, an aroma can also be jetted onto a food product.

DETAILED DESCRIPTION

Figure 1:
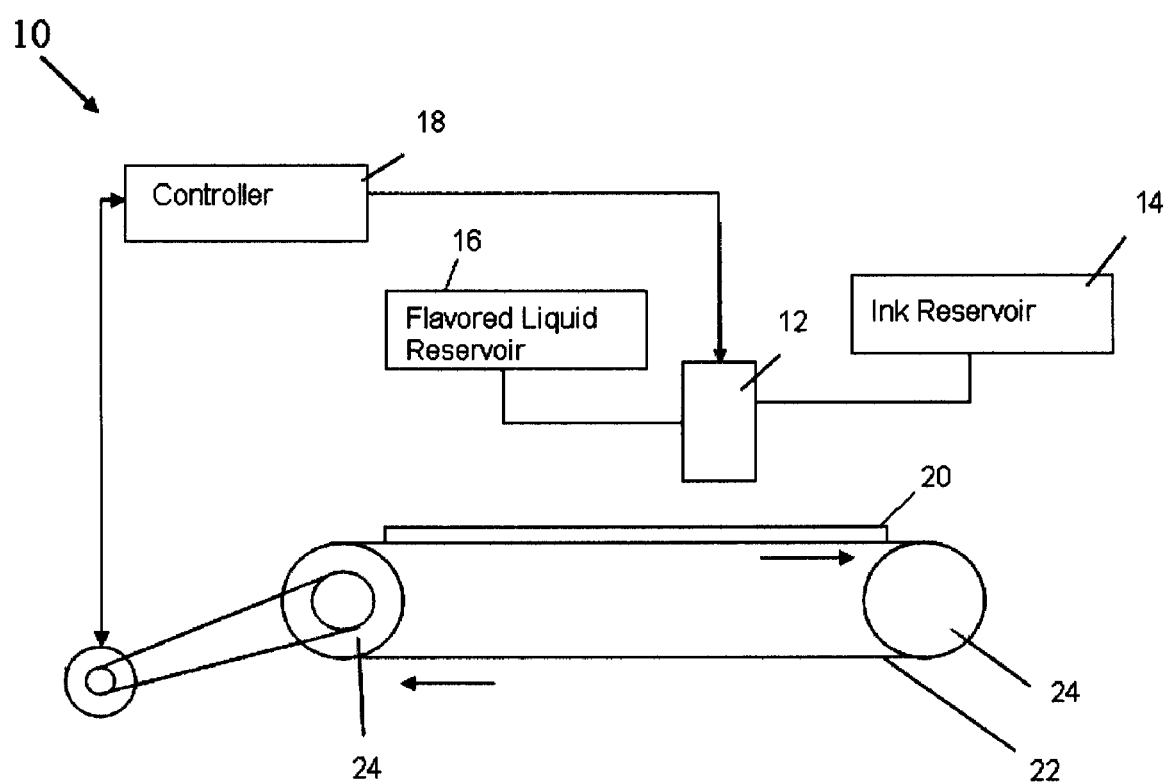
FIG. 1 depicts a schematic of a printing system with an ink reservoir and a flavored liquid reservoir connected to a printhead.

A printing system can be configured to jet flavors, images, and aromas onto food products. Referring to FIG. 1, a printing system 10 includes a printhead 12 coupled to an ink reservoir 14 and flavored liquid reservoir 16. A controller 18 is coupled to the printhead 12 and sends instructions to the printhead 12 to jet the ink and flavored liquid. In response to instructions from the controller 18, the printhead 12 prints flavored images onto the substrate 20. The printhead 12 has multiple nozzles, some of which jet ink and others that jet the flavored liquid. The substrate 20 moves along a conveyor belt 22, which is moved by rollers 24, and underneath the printhead 12. By way of example, the substrate 20 will be referred to as a food product.

Figure 2:
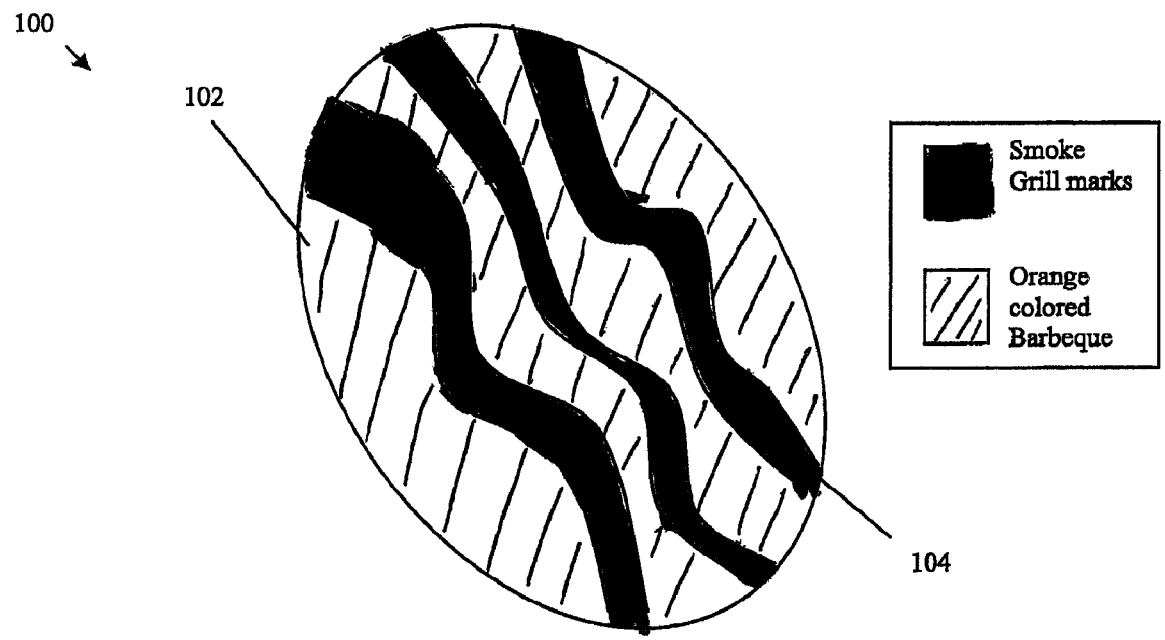
FIG. 2 depicts a food product with orange, barbeque-flavored sections and gray, smoke-flavored grill marks.

FIG. 2 depicts a potato chip 100 that is smoke-barbeque flavored. To enhance the sensory experience of eating, the potato chip 100 is printed with ink colors, images, and flavors that correlate to each other. The orange-colored sections 102 (slanted-line section) are ink jetted orange and deposited with barbeque flavoring. The orange sections are separated by grill marks 104 (shaded section) that are ink jetted gray and deposited with smoke flavoring. The grill marks 104 and orange-colored sections give the consumer the impression that the potato chip 100 was seared over a grill and basted with barbeque sauce. To further enhance the eating experience, a barbeque aroma can be jetted onto the chip 100 to engage a person's sense of smell.

Figure 3:
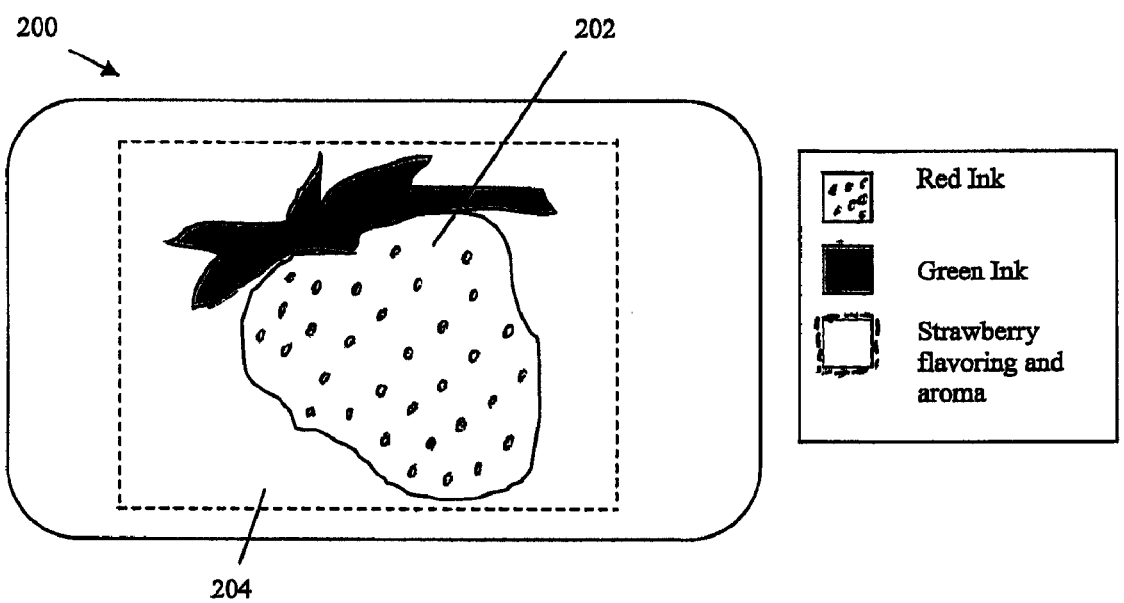
FIG. 3 depicts a pastry jetted with a picture of a strawberry, strawberry flavored liquid, and strawberry aroma.

FIG. 3 depicts a pastry 200 printed with a strawberry image 202 along with strawberry flavoring and aroma 204. The body of the strawberry 202 is jetted with red ink (dotted section) and the top of the strawberry 202 is jetted in green ink (shaded section). The strawberry flavoring and aroma are jetted inside the dashed lined area 204, such that the flavoring and aroma cover the strawberry image as well as the surrounding area. Consumers may perceive the pastry to taste even more like strawberries because their sense of sight, taste, and smell are all engaged at the same time. A person views the red juicy strawberry printed on the pastry, tastes the strawberry flavoring, and smells the strawberry aroma simultaneously. This correlation between the red ink color, strawberry image, strawberry flavor, and strawberry aroma enhance the sensory perception.

In some implementations, the images on the food product can be jetted with a flavored ink, which is a mixture of an ink and flavored liquid. For example, purple ink and grape flavoring can be combined to make a grape-flavored ink. A printhead can jet images using the flavored ink onto a web of dough, which is later cut into individual pieces (i.e., cookies).

In an implementation, the flavored liquid can be a glycol solution with a flavoring added to it. The flavored liquid can be encapsulated and suspended in a carrier fluid to make an emulsion. Also, the flavor can be solid particles, which can be coated, or the flavor can be powder that is encapsulated. The carrier fluid can be glycol-based or water-based. The carrier fluid chosen to suspend the flavor depends on how the flavor is encapsulated. For example, if the flavor is oil-based then the carrier is water-based and vice versa.

By encapsulating the flavor, the flavor can be localized to a specific area on the food product. The consumer can only taste the flavor when the consumer bites into the encapsulated flavor. In contrast, when a flavored liquid is not encapsulated, the flavor penetrates the surface of the food product and may even spread into the surrounding area causing the entire food product to taste like the flavored liquid.

In an implementation using encapsulated flavors, a food product is divided into several sections, and each section is printed with a different flavor. For example, a cracker is deposited with 4 different flavored sections, such as sour cream and onion, bacon, peanut butter, and cheese.

In another implementation, individual food products are printed with different flavored images that are combined to create new flavors. For instance, a piece of candy has a picture of a peanut that tastes like peanut butter, and a second piece of candy has a picture of a grape that tastes like grape jelly. The two pieces are combined to create a candy that tastes like a peanut butter and jelly sandwich. The candies can be contained in a package (i.e., a bag or box), which has a table of the different combinations of candies to create new flavors.

Figure 4:
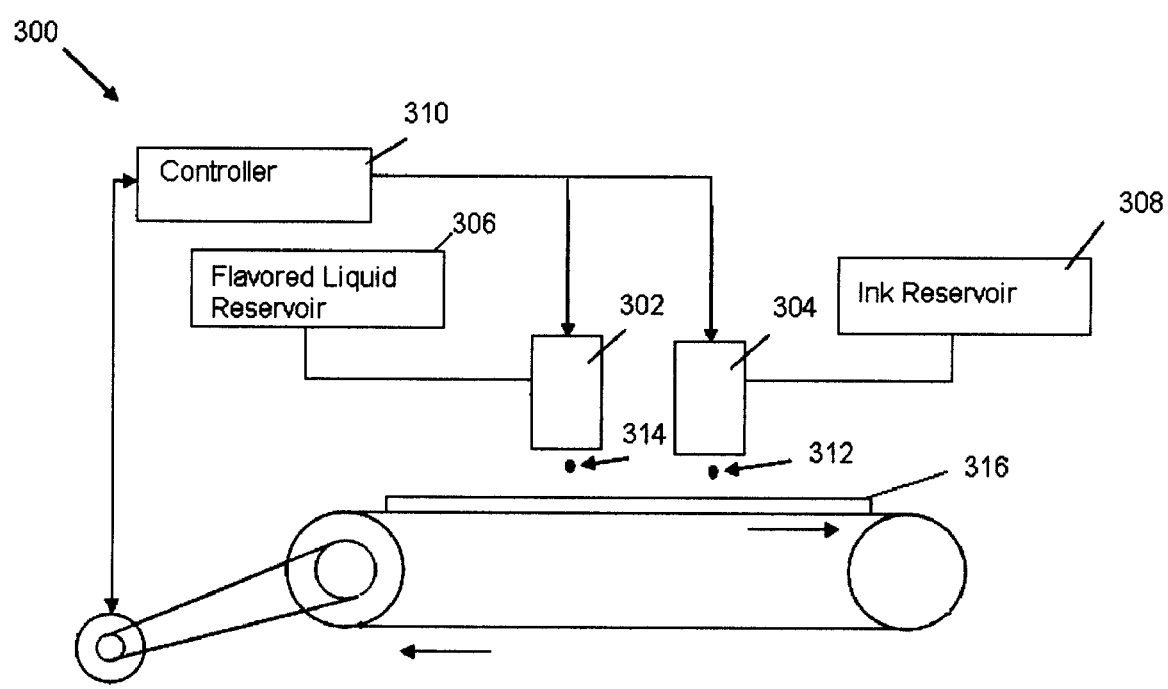
FIG. 4 depicts a schematic of a printing system with an ink reservoir connected to a first printhead and a flavored liquid reservoir connected to a second printhead.

Referring to FIG. 4, the printing system 300 has two printheads, a flavored liquid printhead 302 and an ink printhead 304, coupled to a flavored liquid reservoir 306 and ink reservoir 308 respectively. The controller 310 sends instructions to the ink printhead to print ink 312 and to the flavored liquid printhead to deposit a flavored liquid 314 on the food product 316. The flavored liquid can be printed on the same area as the ink image. Alternatively, the image can be printed on the center of the food product while the flavored liquid can be printed on the edges of the food product. By printing on the edges of the food product, customers taste the flavor when they first bite into it.

Other implementations are within the scope of the following claims. For example, FIG. 1 shows a printing system with two fluid reservoirs, but other implementations can have more than two fluid reservoirs. For instance, a printhead can be connected to four ink reservoirs (i.e., CMYK) and five flavor reservoirs (i.e., bitter, sweet, salt, sour, and umami). The nozzles within the printhead can be divided into nine sections, such that each section jets one of the nine possible fluids. The five flavors can be used to create a flavor spectrum akin to the color spectrum created by the four inks (cyan, yellow, magenta, and black).

Additionally, the printhead can be connected to several aroma reservoirs, in which the controller selects an aroma that correlates with the images and flavors printed on the substrate. Other implementations may print only two of the three materials on a substrate, such as ink and flavored liquid, ink and aroma, or flavored liquid and aroma.

In another implementation of FIG. 1, the ink and flavored liquid from separate reservoirs are combined in a single fluid chamber inside the printhead prior to jetting. The ink and flavored liquid mix together in the fluid chamber prior to jetting rather than designating a set of nozzles to jet the ink and another set to jet the flavored liquid. In this implementation, all of the nozzles jet the combined fluid.

While FIG. 4 shows two printheads each coupled to a fluid reservoir, other implementations of FIG. 4 can have multiple printheads coupled to multiple reservoirs. For example, four printheads are coupled to four reservoirs containing ink (i.e., CMYK) and eight other printheads are coupled to eight flavored liquid reservoirs (i.e., strawberry, banana, vanilla, raspberry, grape, watermelon, orange, and cherry). The printheads can print multicolor images as well as multi-flavored liquids. For instance, the printing system could print a picture of a red strawberry and yellow banana on a piece of gum and deposit strawberry and banana flavorings to make a strawberry-banana flavored piece of gum. Also, a piece of gum can be printed with strawberry, raspberry, and grape to make berry-flavored gum.

In implementations of the printing systems in FIG. 1 or 4, the controller can be a computer that has a database for storing images and flavor combinations. The controller creates a bitmap of the image and flavors, which are sent to the printhead for printing. Also, an aroma printhead can print an aroma from an aroma reservoir onto the food product.

The printing system can be used to print on any kind of substrate, such as a sheet of dough, discrete articles (i.e., cookies, candies, or dog treats), food products (i.e., crackers, chips, fruit leather, pastries, cupcakes, or gum), pharmaceuticals (i.e., vitamins, aspirin, or prescription medication), or flowable substrates (i.e., ice cream, yogurt, or coffee).

The ink used to print on a food product can be FDA certified food colorants for digital decoration, such as Tapestry™ edible jetting fluid sold by FUJIFILM Dimatix, Inc. or an edible hot melt ink. Flavored liquids can include flavors, such as fruit flavors, sour cream and onion, barbeque flavor, chocolate, peanut butter, pistachio, vanilla, cinnamon, honey, or any other flavor.

Other implementations and combinations of these implementations are within the scope of the following claims.

A variety of printheads can be used, such as piezoelectric ink jet printheads including Galaxy PH 256, available from FUJIFILM Dimatix, Inc. The Galaxy printheads can print about 30, 50, or 80 picoliter drops. Using an ink jet printhead, precise amounts of ink and flavored liquids can be deposited onto a food product. Ink jet printing can also control the placement of flavors on particular areas of a substrate. Digital printing can be used to customize items on a job-by-job basis, such that each item is different. The flavor and images can be changed job-by-job, or the image can be the same but the flavor can be different for each job and vice versa, or the flavor and image can be part of a single data file. The ink jet printhead can deposit multiple layers of different flavors to create new flavors.

What is claimed is:

1. A system, comprising:
a first reservoir holding an ink and coupled to a first fluid delivery printing element; and
a second reservoir holding a flavored liquid and coupled to a second fluid delivery printing element,
the ink in the first reservoir having a color that correlates with a flavor of the flavored liquid in the second reservoir, and the flavored liquid in the second reservoir comprising an encapsulated flavoring suspended in a carrier fluid, the carrier being chosen based on how the flavoring is encapsulated such that the encapsulated flavoring is capable of remaining suspended in the carrier fluid.

2. The fluid delivery system of claim 1, in which the first and second printing elements comprise ink nozzles of a printhead.

3. The fluid delivery system of claim 1, in which the first and second printing elements comprise first and second printheads.

4. The fluid delivery system of claim 1, further comprising a controller to control the first fluid delivery printing element to deposit the ink onto a substrate and to control the second fluid delivery printing element to deposit the flavored liquid onto the substrate.

5. The fluid delivery system of claim 4, wherein the controller is configured to control the first fluid delivery printing element to deposit the ink onto an area of the substrate and to control the second fluid delivery printing element to deposit the flavored liquid onto the same area of the substrate.

6. The system of claim 4, wherein the controller is configured to control the first fluid delivery printing element to print an image on the substrate and to control the second fluid delivery printing element to deposit the flavored liquid on an edge the substrate such that the flavor is tasted on a first bite of the substrate.

7. The fluid delivery system of claim 1, wherein the ink comprises a FDA certified substance.

8. The fluid delivery system of claim 1, further comprising a conveyor for moving a substrate relative to the printing elements.

9. The fluid delivery system of claim 1, wherein the flavored liquid comprises a flavoring and a glycol solution.

10. The fluid delivery system of claim 1, wherein the fluid delivery printing elements comprise piezoelectric ink jet printheads.

11. The system of claim 1, further comprising a plurality of reservoirs and a plurality of printing elements, each reservoir being connected to a printing element, the plurality of reservoirs including four reservoirs for ink colors: cyan, magenta, yellow, and black, and five reservoirs for flavors: bitter, sweet, salt, sour, and umami.

12. The system of claim 11, further comprising a controller configured to create a color spectrum from the cyan, magenta, yellow, and black, and to create a flavor spectrum using bitter, sweet, salt, sour, and umami.

13. The system of claim 12, wherein the controller is further configured to create a bitmap from the ink colors and flavors.

14. The system of claim 12, wherein the flavored liquid comprises an encapsulated flavoring suspended in a carrier fluid to form a localized flavor on the substrate, the carrier fluid being chosen based on how the flavoring is encapsulated such that the encapsulated flavoring is capable of remaining suspended in the carrier fluid.

15. A fluid delivery system, comprising:
a printing element;
a fluid reservoir coupled to the printing element; and
a flavored ink comprising an ink color and a flavor and contained in the fluid reservoir for printing by the printing element onto a substrate, the ink color correlating with the flavor, and the flavor comprising an encapsulated flavoring suspended in a carrier fluid, the carrier fluid being chosen based on how the flavoring is encapsulated such that the encapsulated flavoring is capable of remaining suspended in the carrier fluid.

16. The fluid delivery system of claim 15, further comprising a controller configured to control the printing element to eject the flavored ink onto the substrate.

17. A method of printing, comprising:
jetting a flavored ink comprising an ink color and a flavor to form an image on a substrate, the ink color correlating with the flavor, the flavor comprising an encapsulated flavoring suspended in a carrier fluid to form a localized flavor on the substrate, the carrier fluid being chosen based on how the flavoring is encapsulated such that the encapsulated flavoring is capable of remaining suspended in the carrier fluid.

18. The method of claim 17, further comprising moving the substrate along a conveyor.

19. The method of claim 17, wherein the substrate comprises an edible food product.

20. The method of claim 17, wherein the substrate comprises a web.

21. The method of claim 17, further comprising depositing an aroma on the substrate.

22. The method of claim 17, wherein the flavored ink is jetted using an ink jet printing element.

23. The method of claim 22, wherein the ink jet printing element comprises a piezoelectric ink jet printhead.

24. The method of claim 17, further comprising dividing the substrate into a plurality of sections and jetting a different flavored ink on each section.

* * * * *

UNITED STATES PATENT AND TRADEMARK OFFICE
CERTIFICATE OF CORRECTION

| | | |
|---|---|---|
| PATENT NO. | : 8,109,606 B2 | Page 1 of 1 |
| APPLICATION NO. | : 11/689648 | |
| DATED | : February 7, 2012 | |
| INVENTOR(S) | : Edward R. Moynihan | |

It is certified that error appears in the above-identified patent and that said Letters Patent is hereby corrected as shown below:

Column 4, line 62, in claim 1:

Delete "carrier" and insert --carrier fluid--;

Column 5, lines 17-18, in claim 6:

Delete "on an edge the substrate" and insert --on an edge of the substrate--.

Signed and Sealed this
Twenty-sixth Day of June, 2012

David J. Kappos
*Director of the United States Patent and Trademark Office*